United States Patent
Supalov (10) Patent No.: US 7,567,557 B2
(45) Date of Patent: Jul. 28, 2009

(54) METHOD, SYSTEM AND APPARATUS FOR MULTIFABRIC PRAGMATICALLY TRUNCATED PROGRESS EXECUTION

(75) Inventor: Alexander V. Supalov, Erftstadt (DE)

(73) Assignee: Intel Corporation, Santa Clara, CA (US)

( * ) Notice: Subject to any disclaimer, the term of this patent is extended or adjusted under 35 U.S.C. 154(b) by 861 days.

(21) Appl. No.: 11/027,194

(22) Filed: Dec. 30, 2004

(65) Prior Publication Data

US 2006/0146715 A1    Jul. 6, 2006

(51) Int. Cl.
*H04L 12/50* (2006.01)
(52) U.S. Cl. .................................... 370/360
(58) Field of Classification Search .............. 370/360, 370/238, 252, 388, 220, 231, 357, 359, 398, 370/401, 466, 462, 355, 392, 351, 468, 427, 370/380, 358, 395.7, 368, 236; 711/206; 709/203
See application file for complete search history.

(56) References Cited

U.S. PATENT DOCUMENTS

| | | | | |
|---|---|---|---|---|
| 5,384,773 | A * | 1/1995 | Olnowich et al. | 370/358 |
| 6,628,648 | B1 * | 9/2003 | Francis et al. | 370/360 |
| 6,925,086 | B2 * | 8/2005 | Curtis et al. | 370/395.7 |
| 6,944,152 | B1 * | 9/2005 | Heil | 370/360 |
| 7,103,045 | B2 * | 9/2006 | Lavigne et al. | 370/392 |
| 7,200,237 | B2 * | 4/2007 | Zhang et al. | 381/60 |

* cited by examiner

*Primary Examiner*—Chi H Pham
*Assistant Examiner*—Alexander Boakye
(74) *Attorney, Agent, or Firm*—Blakely, Sokoloff, Taylor & Zafman LLP (57) ABSTRACT

A process, system and device to generate an ordered list based on latency for an operation having many different fabric types. To execute the operation for a first fabric having least latency of other fabrics while progress is made executing the operation for the first fabric and to execute the operation for a second fabric if progress stalls in executing the first fabric. The first fabric has less execution latency than the second fabric.

29 Claims, 6 Drawing Sheets

METHOD, SYSTEM AND APPARATUS FOR MULTIFABRIC PRAGMATICALLY TRUNCATED PROGRESS EXECUTION

BACKGROUND

1. Field

The embodiments relate to reducing overall latency in processing technologies, and more particularly to pragmatically truncating processes in a multi-fabric environment.

2. Description of the Related Art

With today's communication passing environments, such as parallel systems and dedicated switching networks, different types of protocols and devices can be combined. With combined types of devices and protocols, the combined device can have different latency for each device and protocol.

There are different types of standards that have been formed to try to simplify communication passing. One such standard is the message passing interface (MPI, see MPI: A Message-Passing Interface Standard, Message Passing Interface Forum, May 5, 1994; MPI-2: Extensions to the Message-Passing Interface, Message Passing Interface Forum, Jul. 18, 1997). MPI is a de facto standard for communication among the nodes running in a parallel program on a parallel system. MPI comprises a library of routines that can be called from programming languages, such as FORTRAN and C. MPI is portable and fast due to optimization on the platform it is to be run on.

In MPI implementation practice, it may be necessary to combine two or more MPI devices (e.g., lower MPI layers capable of dealing with, for example, only shared memory, or Transmission Control Protocol/Internet Protocol (TCP/IP), or direct access programming library (DAPL) connections) in order to obtain a multi-fabric device (for example, a device that would be able to work with the shared memory, TCP/IP and DAPL connections at the same time).

In order to accomplish processing of a multi-fabric device, most of the process is accomplished by either embedding or invoking the corresponding parts of the respective MPI devices in proper order in the upper layer device code. A problem with this, however, is the problem of getting the resulting multi-device to perform at least nearly as well as the constituent devices. This is particularly challenging when the characteristic latencies of the constituent devices broadly differ.

There are several ways of accommodating the latency difference from the varying devices. One way is to call the respective fabric progress processes adaptively—depending on the expected frequency and/or volume of the messages that the differing fabrics have to communicate.

Variations exist as to how the relative frequencies are to be initialized and tracked. The relative level of activity on the fabrics may change substantially during a typical application run, and there's no generally applicable solution. The same is true for a central processing unit (CPU) yielding. These techniques, however, are either cumbersome and prone to producing unpredictable results, or are inadequate.

BRIEF DESCRIPTION OF THE DRAWINGS

The embodiments discussed herein generally relate to a method, system and apparatus for reducing overall latency for multi-fabric operations. Referring to the figures, exemplary embodiments will now be described. The exemplary embodiments are provided to illustrate the embodiments and should not be construed as limiting the scope of the embodiments.

DETAILED DESCRIPTION

The embodiments discussed herein generally relate to a method, system and apparatus for reducing overall latency for multi-fabric operations. Referring to the figures, exemplary embodiments will now be described. The exemplary embodiments are provided to illustrate the embodiments and should not be construed as limiting the scope of the embodiments.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

One embodiment includes a multi-fabric pragmatically truncated process that predictably retains the latency and bandwidth characteristics of the constituent devices without violating in practice the progress and ordering requirements imposed by the MPI standard.

Figure 1A:
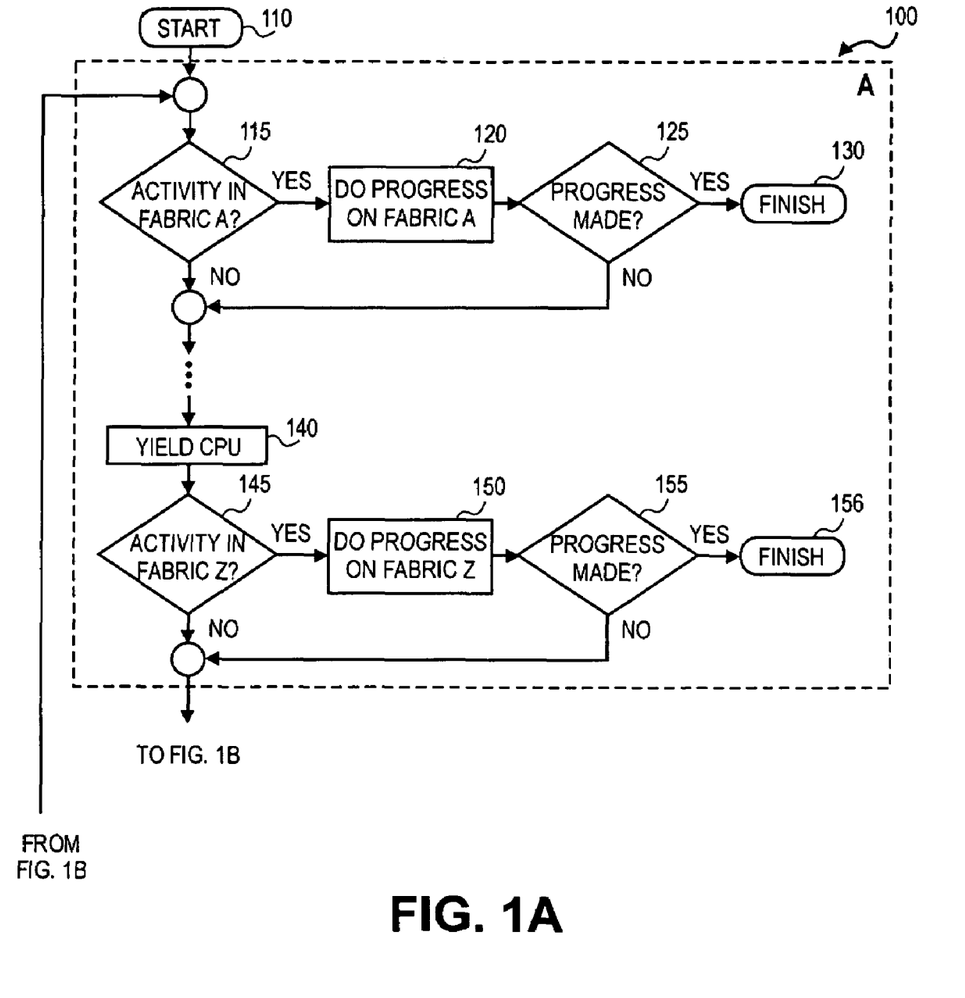
FIGS. 1A-1B illustrate a block diagram of a process of an embodiment.
Figure 1B:
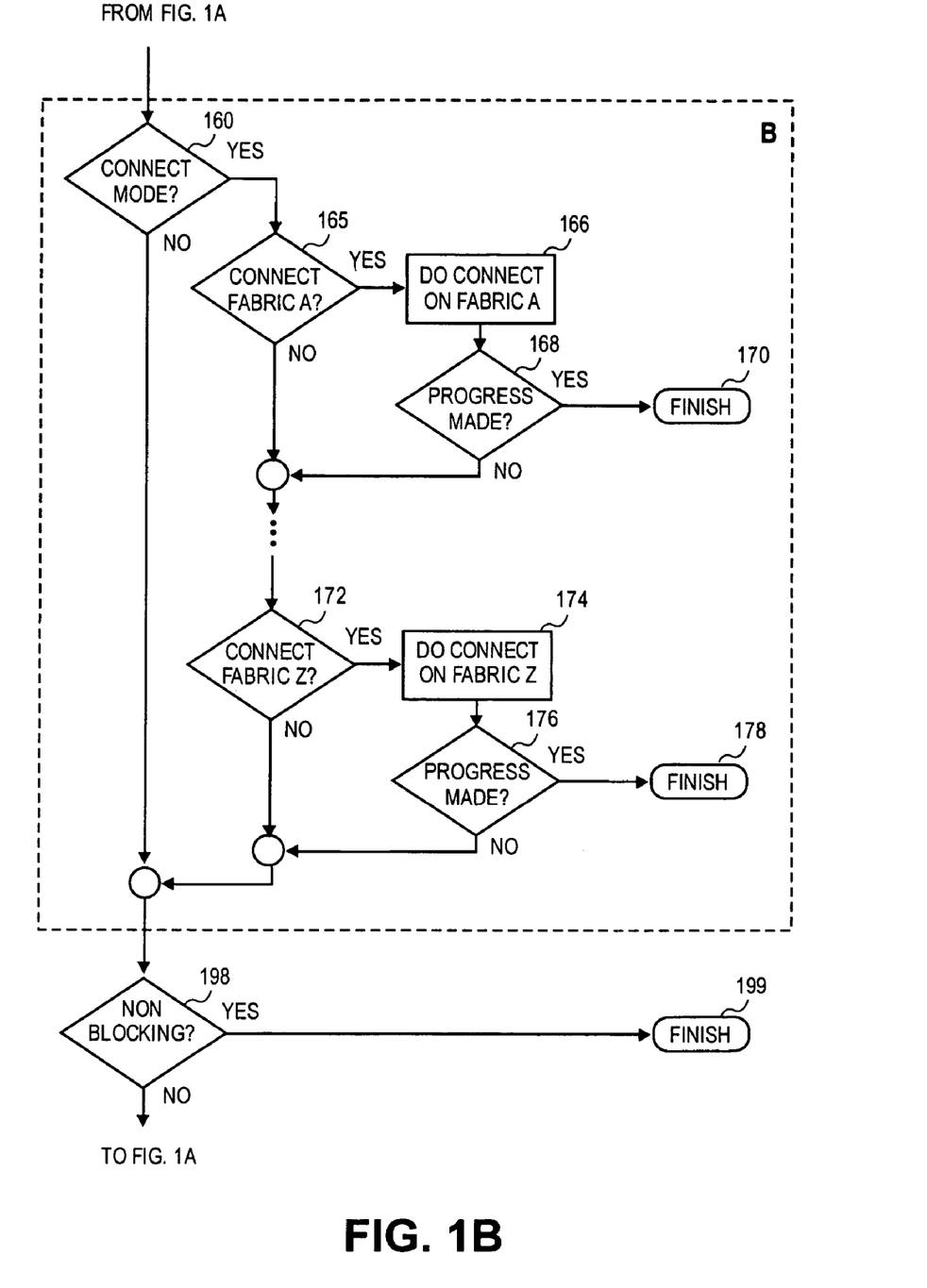

FIGS. 1A-1B illustrate an embodiment of a process in block form. In one embodiment upon invocation by the internals of an appropriate message passing interface (MPI) routine (e.g., MPI_Recv, MPI_Probe, MPI_Test, MPI_Wait, etc.), process 100 commences at block 110. Process 100 continues with block 115 that determines in a fabric specific way whether the progressively slower fabrics (denoted as A, B . . . Z) have any activity to be attended to, such as receive or send a message or packet. If block 115 determines that the fastest fabric (i.e., the least latent fabric of a multi-fabric device, denoted in FIG. 1A as fabric A) has activity to attend to, the respective fabric specific progress modules are called in block 120.

Process 100 continues with block 125. Block 125 determines whether progress has been made with respect to the respective fabric specific modules called in block 120. If progress has indeed been made, the execution of the loop is terminated at block 130. Block 125 determines whether progress is made by return arguments, signals, interrupts, asynchronous events, etc. In another embodiment, after a predetermined time period has passed and a module is actively progressing, block 125 treats the determination whether progress is made as true. In this embodiment, the predetermined time period is based on statistics and average time that a fabric specific module typically takes in a specific system. In another embodiment, after a predetermined time period has elapsed, if progress has not yet reached a predetermined point, process 100 continues as if progress has not been made. In this embodiment, the predetermined time period is based on statistics and average system time that a fabric specific module typically takes to progress to the predetermined point. In another embodiment, a progress counter is either incremented or decremented from an initial value. While the cycle or loop counter is incrementing/decrementing this embodiment determines that progress is being made in block 125.

If it is determined in block 125 that progress is made, process 100 continues with block 130 and exits. If it is determined in block 125 that progress has not been made, process 100 continues with the second least latent fabric of the multi-fabric device and the loop is repeated for each progressively more latent fabrics. When process 100 reaches the most latent fabric (denoted in FIG. 1A as fabric Z), a central processing unit (CPU) in a network platform or computer system, the CPU is yielded unconditionally. In this embodiment, the unconditional yielding of the CPU occurs only once before the last, slowest fabric (denoted as Z in FIG. 1A) is going to be queried for activity in block 145. In this embodiment, the one time yielding minimizes the impact of the CPU yielding upon the overall latency, and still assures other processes or threads a chance of proceeding with their respective execution.

In another embodiment, when process 100 reaches a fabric, where the next or preceding fabric has the same or approximately close latency, a CPU in a network platform or computer system is yielded unconditionally. In this embodiment, the unconditional yielding of the CPU occurs to optimize the overall level of multiprocessing in the system instead of reducing latency. In one embodiment having a plurality of multiple fabrics with latencies that are the same or nearly the same, the order of the progress for these fabrics is not that important. In this embodiment, an unconditional yielding of the CPU occurs before or after any fabric of the multiple fabrics having the same or substantially close latency. Therefore, the CPU can pursue processing of one or more other processes.

If it is determined in block 145 that there is activity in fabric Z, process 100 continues with block 150 where progress is commenced on fabric Z. Process 100 continues with block 155 to determine whether progress has been made on fabric Z, which is similar to block 125. As with block 125, if it is determined in block 155 that progress has been made then process 100 continues to block 156 where process 100 exits. If it is determined in block 155 that progress has not been made for fabric Z (i.e., the fabric specific modules have not been substantially completed through their respective calls), process 100 continues with block 160.

In one embodiment the establishment of connections begins at block 110, as well as block 160. As illustrated in FIG. 1B at block 160 it is determined whether process 100 is in a connection mode. In one embodiment, block 160 determines that process 100 is in a connection mode if an attachment or connection module is active (e.g., a network connection may be requested, an MPI command is transmitted for connection, etc.). If it is determined that process 100 is in a connection mode, process 100 continues with block 165.

In block 165, it is determined whether to connect to a device that is associated with the least latent fabric (denoted as fabric A in FIG. 1B). If it is determined that a connection be made to a device associated with fabric A, process 100 continues with block 166 where connection modules are executed. Similarly to blocks 125 and 155, albeit regarding connection progress, it is determined whether adequate progress is being made with respect to the connection execution.

If it is determined that progress is made in connection to a device associated with fabric A, process 100 continues with block 170 where process 100 exits. If it is determined in block 168 that adequate progress has not been made, process 100 continues with a similar loop for the next connection attempt on the next latent device. Process 100 continues with an attempt to connect similar loops until attempt is made to connect the most latent device. As illustrated in FIG. 1B, process 100 continues with block 172 for fabric Z, which is the most latent fabric. Blocks 172, 174, 176 and 178 comprise the same loop functionality as blocks 165, 166, 168 and 170.

It should be noted that MPI allows blocking and non-blocking operations. For example, MPI_Send is a blocking send. This means the call will not return until it is safe to reuse a specified send buffer. Non-blocking calls enable message passing to be concurrent with computation. For example, a non-blocking operation may be initiated with one MPI call, such as MPI_Isend, MPI_Start, MPI_Startall, etc. Non-blocking calls may also have additional overhead. To increase benefits of non-blocking operations blocking operations can be replaced with non-blocking operations, non-blocking operations can be made as soon as possible, and non-blocking operations can be completed as late as possible.

Upon process 100 attempting to connect the most latent fabric, if no progress is made, process 100 continues to block 198 where it is determined whether a module is a non-blocking type of operation. If block 198 determines that an operation is a non-blocking operation, process 100 continues to block 199 and process 100 exits. If it is determined that an operation is a blocking operation, process 100 continues to start over before block 115, and continues process 100 until completion for at least one fabric.

In one embodiment, the connection handling portion B (beginning with block 160 in FIG. 1B) is active only at the job startup (i.e., in MPI-1 execution mode, MPI: A Message-Passing Interface Standard, Message Passing Interface Forum, May 5, 1994). In another embodiment the connection handling portion B is active throughout the whole job execution (in MPI-2 execution mode, MPI-2: Extensions to the Message-Passing Interface, Message Passing Interface Forum, Jul. 18, 1997). In another embodiment hints are taken for activity from the respective MPI-2 calls (e.g., MPI_Comm_spawn, MPI_Comm_spawn_multiple, MPI_Comm_connect, MPI_Comm_accept, and MPI_Comm_join). In other embodiments connection activity handling blocks are executed after the message passing handling blocks (beginning with block 115 in FIG. 1A).

It should be noted that even if one of the fabrics (e.g., a shared memory fabric) is so active that no other, slower fabric gets a chance to make progress doesn't seem to occur as applications tend to communicate in an orderly manner. Therefore, once in a while every fabric enters quiescent state and others get their chance for making progress. Since one "isolated" part of an application can run away, in a typical program it would eventually reach a point of synchronization with other parts of the application, and make progress on the slower fabrics because due to the logic of process 100 it wouldn't be able to send any messages across the fastest fabric for some time.

Giving advantage to one fabric is allowed from the point of the MPI standard in that the MPI standard explicitly does not guarantee fairness of the execution of calls. That is, some messages that go through one of the fabrics can overtake all others. Most lower layer fabrics (e.g., TCP/IP) have their own ways of ensuring low level progress and flow control of the messages, so that it is not likely that messages will become lost, corrupted, or timed out. It should be noted that there is a remote possibility of resource exhaustion, but only a "high quality" MPI implementation should avoid this according to the MPI standard.

By ordering the constituent devices according to the increase of the characteristic latency, process 100 allocates most of the time to the fastest fabric.

Figure 2A:
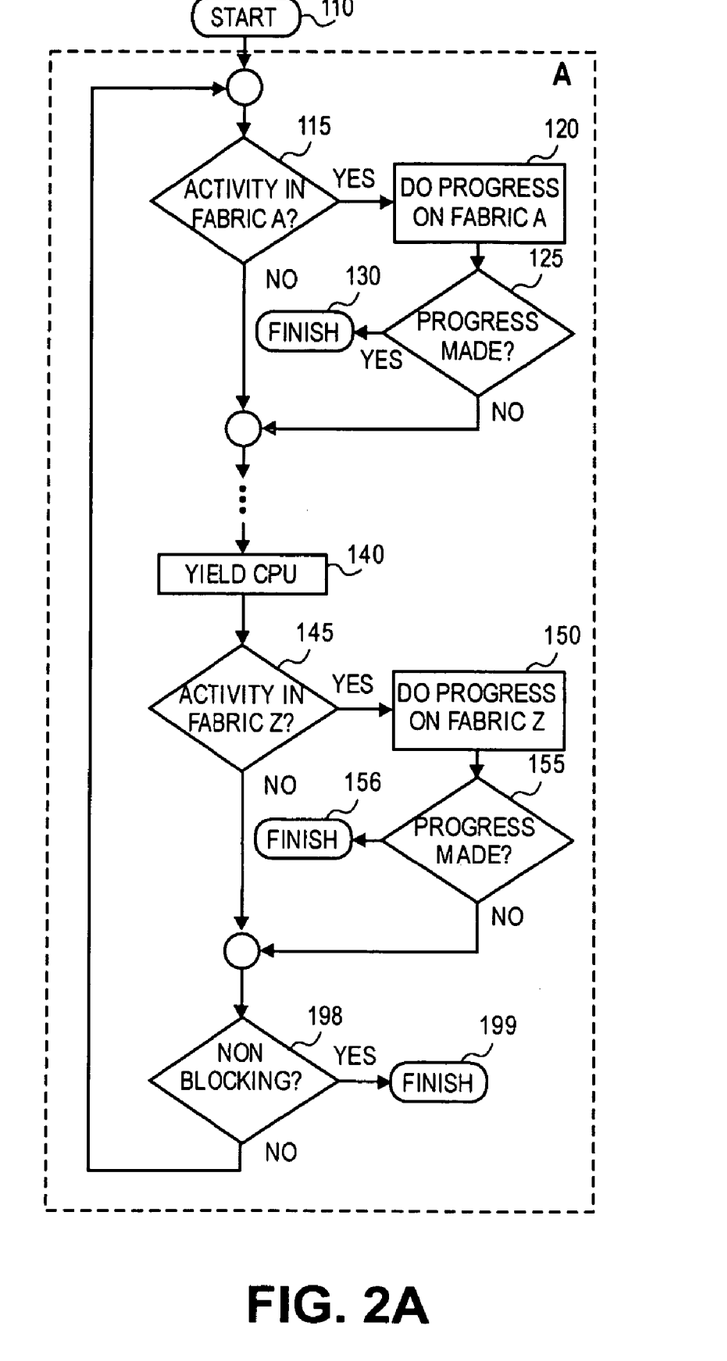
FIGS. 2A-2B illustrate another block diagram of a parallel process of an embodiment.
Figure 2B:
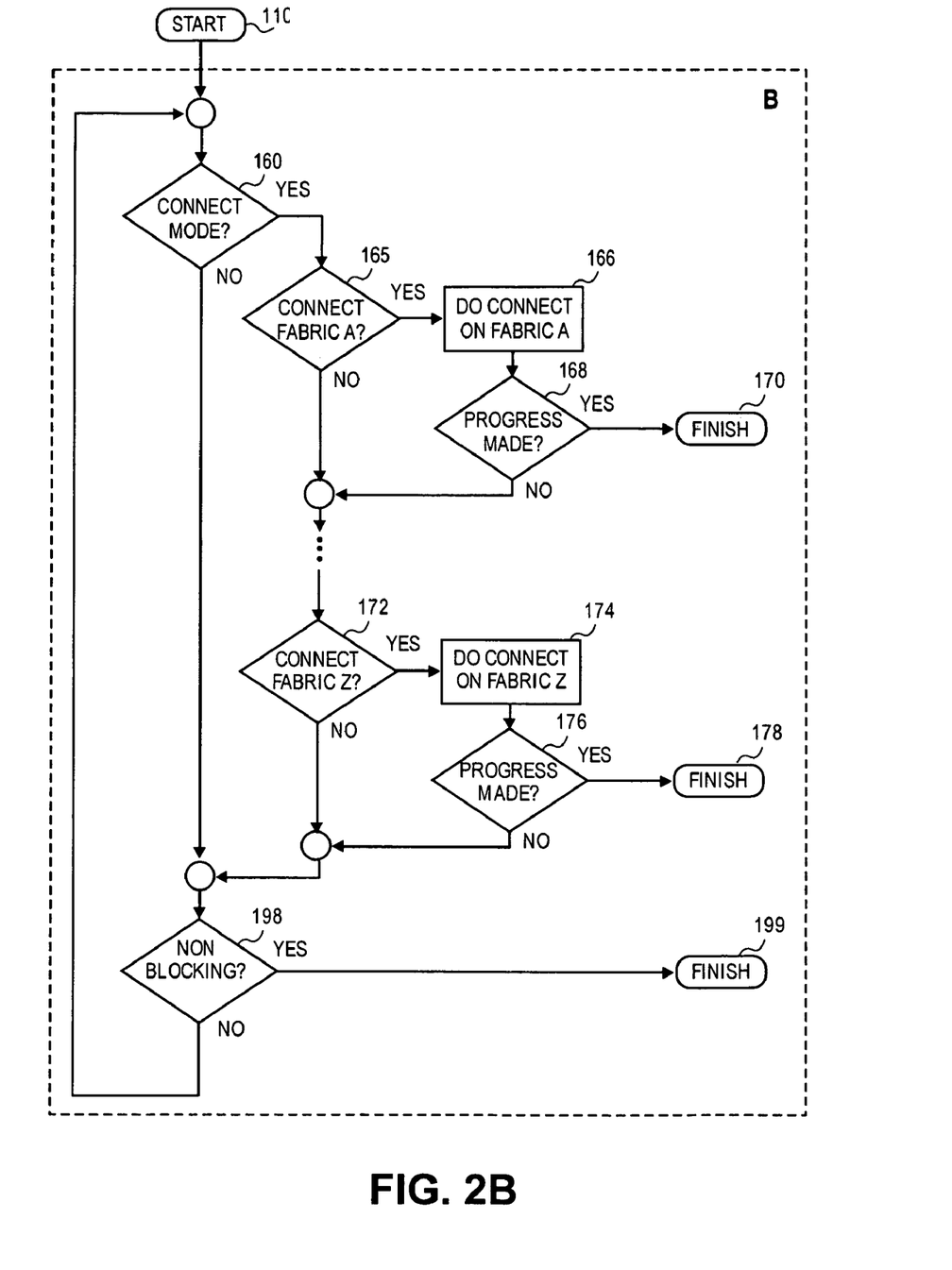

FIGS. 2A and 2B illustrates another process in block form for an embodiment. Process 200 is similar to process 100 except instead of the fabric progress portion A (beginning with block 115 in FIG. 2A) and the connectivity portion B (beginning with block 160 in FIG. 2B) being performed serially, both portions are separate related portions performed in parallel. It should be noted that the connectivity portion B (FIG. 2B) in process 200 can be performed before, after, or during performance of the fabric progress portion A (FIG. 2A).

In one embodiment, multiple instances of fabric progress portion A and connectivity portion B can be executed simultaneously. In this embodiment, parallel data transmission progress for multiple fabrics, whether the same or different, are performed simultaneously. In one embodiment, progress portion A and connectivity portion B do not need to be performed at the same starting point in time. That is, the commencing of progress portion A and connectivity portion B can be staggered in any fashion to optimize performance and reduce latency.

Figure 3:
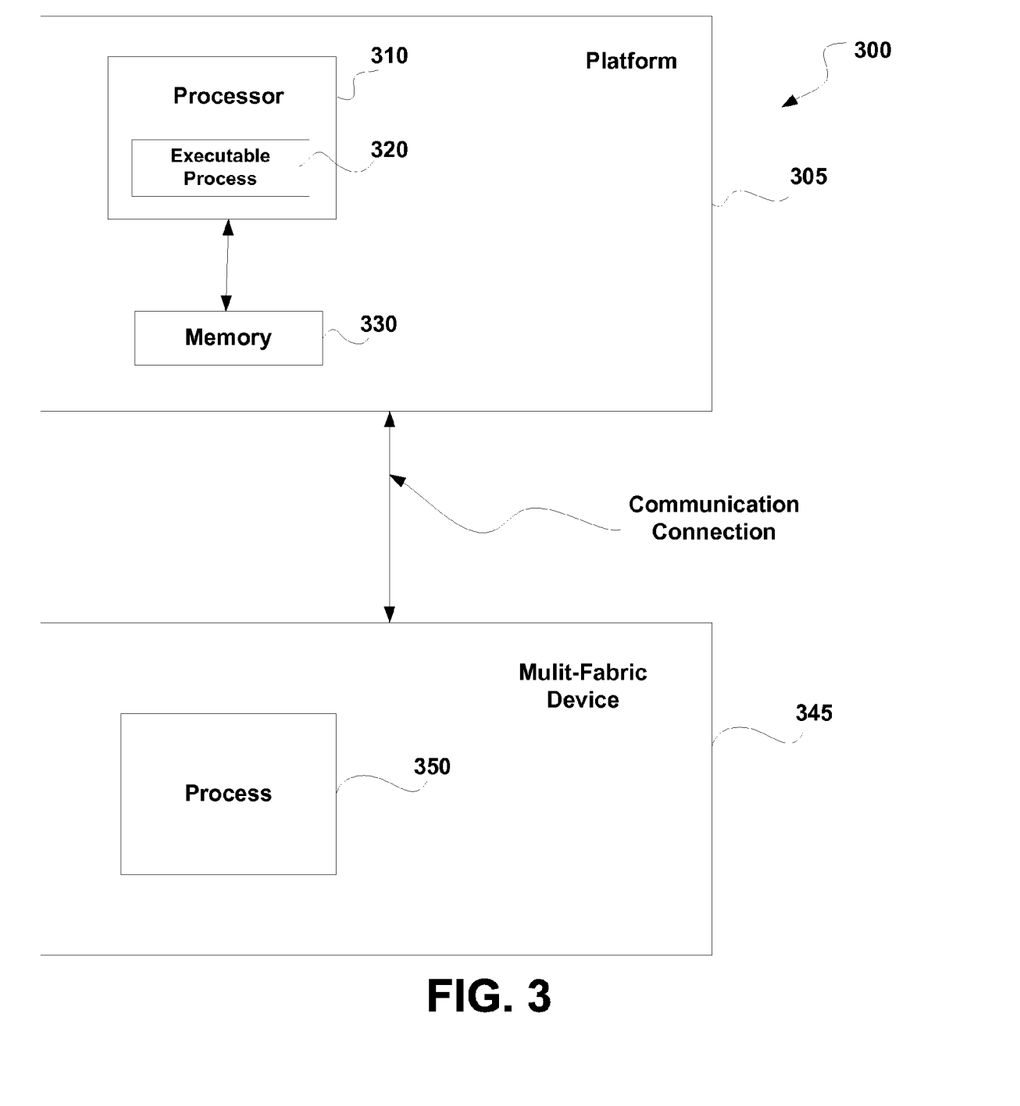
FIG. 3 illustrates a system of an embodiment.

FIG. 3 illustrates a system of an embodiment including a process for reducing overall latency for multi-fabric devices. System 300 includes a platform 305 including a processor 310 and a memory 330. Processor 310 can be a processor, such as a central processing unit (CPU). In one embodiment memory 330 is a main memory, such as random-access memory (RAM), static random access memory (SRAM), dynamic random access memory (DRAM), synchronous DRAM (SDRAM), read-only memory (ROM), etc. In another embodiment, memory 330 is a cache memory.

In one embodiment processor 310 includes process 320. In one embodiment process 320 is in the form of an executable process running in processor 310 and communicating with memory 330. In one embodiment process 320 includes process 100 for use with MPI multi-fabric devices. In another embodiment process 320 includes process 200 for use with MPI multi-fabric devices. In yet another embodiment, process 320 includes either process 100 or process 200 for use with network multi-fabric devices that communicate with one another that may include MPI multi-fabric devices or non-MPI multi-fabric devices.

System 300 further includes multi-fabric device 345 coupled to platform 305. In one embodiment multi-fabric device 345 includes process 350. In one embodiment either process 100 or process 200 is included in process 350. In another embodiment, multiple multi-fabric devices are connected to platform 305. The connection between multi-fabric device(s) and platform 305 can be in the form of a bus, a wireless connection, over a network connection, etc.

In one embodiment multi-fabric device 345 includes a number of different types of network devices supporting different fabric protocols. In another embodiment multi-fabric device 345 includes different types MPI devices supporting different fabric protocols.

Figure 4:
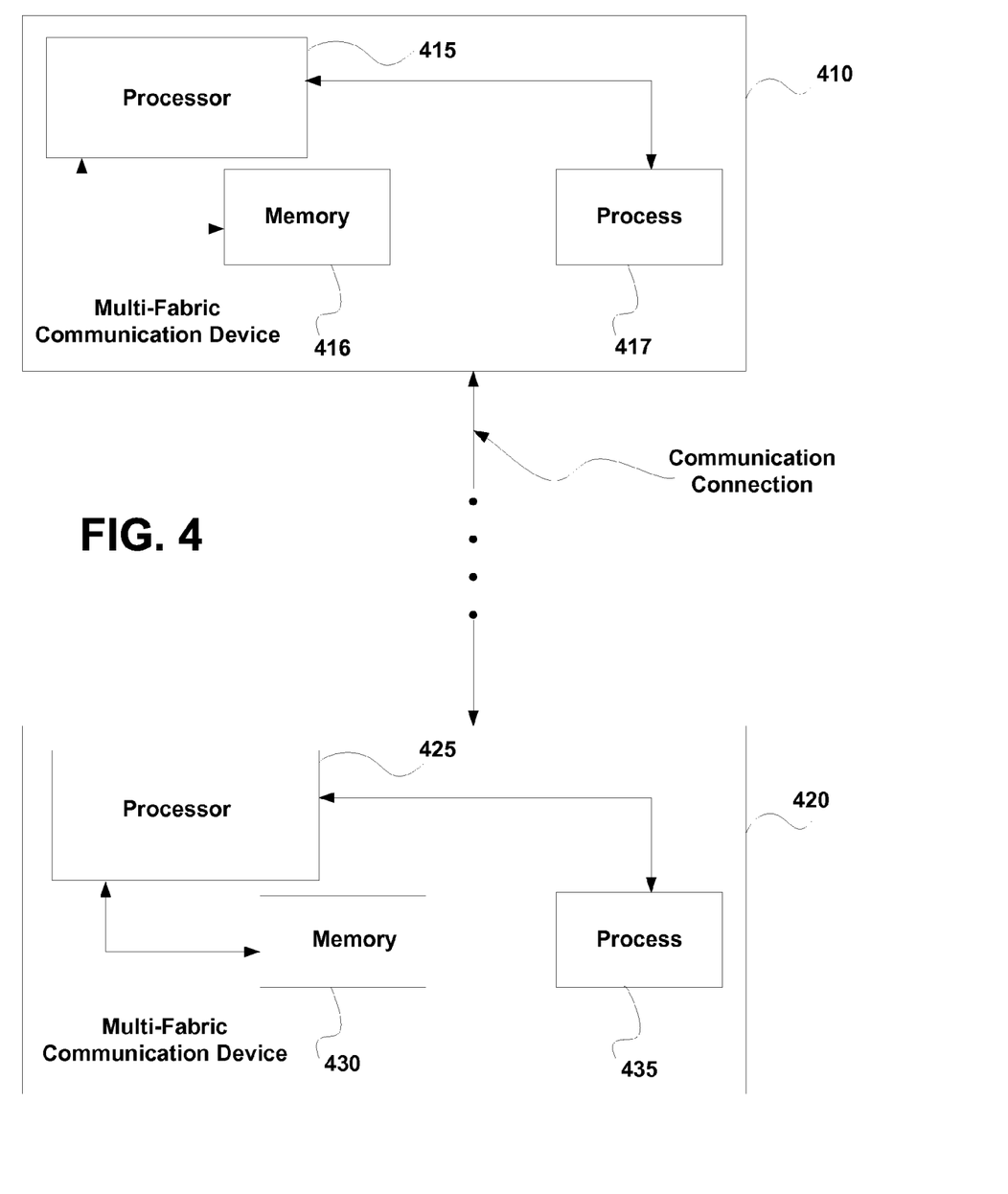
FIG. 4 illustrates network devices including an embodiment.

FIG. 4 illustrates an embodiment of multi-fabric communication devices 410 and 420. Multi-fabric communication device 410 includes processor 415 connected to memory 416 and process 417. Processor 415 can be a processor, such as a CPU, a network card processor, etc. Memory 416 is similar to memory 330. In one embodiment process 417 includes process 100. In another embodiment, process 417 includes process 200.

Multi-fabric communication device 420 includes processor 425 connected to memory 430 and process 435. Processor 425 can be a processor, such as a CPU, a network card processor, etc. Memory 430 is similar to memory 330. In one embodiment process 435 includes process 100. In another embodiment, process 435 includes process 200.

Multi-fabric devices 410 and 420 communicate with one another over a connection, such as a bus, a wireless connection, a network connection, etc. In one embodiment multi-fabric devices 410 and 420 are MPI devices. In another embodiment, multi-fabric devices 410 and 420 are multi-fabric network devices including multiple devices supporting different networking protocols.

It should be noted that process 100 and process 200 can be implemented for other embodiments including command sets, instruction sets, devices, etc. where each member of a set performs its respective function at a different latency than another member of the set. That is, a hierarchical latency layout exists where less latent members are serviced/connected before more latent members. In one embodiment an ordered list is first generated based on latency for an operation for a multi-fabric device supporting many different fabric types. The operation is executed while progress is made for a first fabric type that has the least latency of other fabric types supported by the multi-fabric device. The operation is executed for a second fabric type if progress stalls in executing the operation for the first fabric type. The first fabric type has less execution latency for the operation than the second fabric type. In one embodiment a processor (e.g., a CPU) is yielded before executing the operation for a third fabric type. In another embodiment a processor (e.g., a CPU) is yielded after executing the operation for a third fabric type. The third fabric type has the most latency of the different fabric types. In one embodiment if the operation is a blocking operation, the operation is executed for all fabric types until the operation completes for at least one fabric type. In the above embodiments, the processor is unconditionally yielded to optimize the overall level of multiprocessing.

The above embodiments can also be stored on a device or a computer-readable storage medium and be read by a machine to perform computer executable instructions. The computer-readable storage medium includes any mechanism that provides (i.e., stores and/or transmits) information in a form readable by a machine (e.g., a computer). For example, a computer-readable storage medium includes read-only memory (ROM); random-access memory (RAM); magnetic disk storage media; optical storage media; flash memory devices; biological electrical, mechanical systems; electrical, optical, acoustical etc. The device or computer-readable storage medium may include a micro-electromechanical system (MEMS), nanotechnology devices, organic, holographic, solid-state memory device and/or a rotating magnetic or optical disk. The device or computer-readable storage medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   determining fabric types for a multi-fabric communications device having a processor, connected to a shared memory, and a plurality of network devices with different fabric types;
   generating an ordered list for a plurality of fabric types based on latency;
   determining whether commands are requested for a first fabric type;
   executing commands for the first fabric type if commands are requested for the first fabric type; and
   determining whether commands are requested for a second fabric type if the requested commands for the first fabric type do not progress to a first predetermined point after a first predetermined time period;
   wherein the first fabric type has a latency less than the second fabric type.

2. The method of claim 1, further comprising:
   unconditionally yielding a processor for executing a process one of before and after executing commands for a fabric type having most latency of the plurality of fabric types.

3. The method of claim 1, further comprising:
   determining whether a connection request is received for the first fabric type;
   connecting the first fabric type if it is determined the connection request was received for the first fabric type;
   determining whether the connection of the first fabric type has progressed to a second predetermined point for a second predetermined time period;
   determining whether a connection request for the second fabric type is received if it is determined that the connection of the first fabric type has not progressed to the first predetermined point;
   connecting the second fabric type if it is determined the connection request was received for the second fabric type;
   determining whether the connection for the second fabric type has progressed to a third predetermined point for a third predetermined time period; and
   determining whether a command request is a non-blocking command.

4. The method of claim 3, further comprising:
   stopping if it is determined that the command request is a non-blocking command, and
   restarting if it is determined that the command request is a blocking command.

5. The method of claim 1, further comprising:
   completing the requested commands for the first fabric type if the requested commands progress to the first predetermined point after the first predetermined time period.

6. The method of claim 1, wherein the plurality of fabric types comprises different communication protocols.

7. The method of claim 1, wherein the multi-fabric device comprises one of a plurality of message passing interface (MPI) devices and the plurality of networking devices.

8. A system comprising:
   a processor;
   a memory coupled to a processor;
   a multi-fabric device coupled to the processor; and
   a first process to execute in the processor, the first process to execute first fabric based commands while progress in execution is made, and to execute second fabric based commands when progress in execution of the first fabric commands stalls, wherein the second fabric commands are more latent than the first fabric commands.

9. The system of claim 8, further comprising:
   a second process to execute in the processor, the second process to connect the first fabric type while first fabric type connection commands progress, and to connect the second fabric type when the first fabric type connection commands stall.

10. The system of claim 9, wherein the multi-fabric device comprises one of a plurality of different types of network devices and a plurality of different types of message passing interface (MPI) devices.

11. The system of claim 9, further comprising a plurality of instances of the first process and a plurality of instances for the second process, wherein the plurality of instances of the first process and the plurality of instances of the second process execute in parallel for one of a plurality of same fabric types and a plurality of different fabric types.

12. A computer-readable storage medium encoded with computer executable instructions that, when executed, cause a computer to:
    generate an ordered list for a plurality of communication fabric types based on latency;
    execute requested commands for a first communication fabric type of the plurality while progress is made executing the commands for the first communication fabric type of the plurality; and
    execute requested commands for a second communication fabric type of the plurality if progress stalls in executing the commands for the first communication fabric type of the plurality;
    wherein the first communication fabric type of the plurality has one of a same latency and a lesser latency than the second communication fabric type of the plurality.

13. The computer-readable storage medium of claim 12, further comprising encoded computer executable instructions that, when executed, cause the computer to:
    one of yield a processor for executing a process one of before and after executing commands for a communication fabric type having a greatest latency of the plurality of communication fabric types, and yield a processor for executing a process one of before and after executing commands for a first communication fabric type having substantially a same latency as a second communication fabric type of the plurality of communication fabric types, and yield a processor after executing commands for a second communication fabric type.

14. The computer-readable storage medium of claim 12, further comprising encoded computer executable instructions that, when executed, cause the computer to:
    determine whether a connection mode exists;
    connect the first communication fabric type of the plurality if it is determined the connection mode exists and a connection request for the first communication fabric type of the plurality is made;
    determine whether the connection of the first communication fabric type of the plurality has progressed; and
    complete the connection if it is determined that the connection of the first communication fabric type of the plurality has progressed.

15. The computer-readable storage medium of claim 14, further comprising encoded computer executable instructions that, when executed, cause the computer to:
    connect to the second communication fabric type of the plurality if the connection of the first communication fabric type of the plurality has not progressed; and complete the connection if it is determined that the connection of the second communication fabric type of the plurality has progressed.

16. The computer-readable storage medium of claim 12, wherein the plurality of communication fabric types comprises different network communication protocols.

17. The computer-readable storage medium of claim 14, wherein the multi-fabric device comprises a plurality of one of network devices and message passing interface (MPI) devices.

18. A multi-fabric communication device comprising:
a processor; and
a first embedded logic to execute in the processor, the first logic to execute first fabric based commands having a first latency, and to execute a second fabric based commands having a second latency, wherein execution of the second fabric based commands commence if progress stalls in execution of the first fabric commands.

19. The multi-fabric communication device of claim 18, wherein the first fabric based commands are less latent than the second fabric based commands.

20. The multi-fabric communication device of claim 18, further comprising:
a second embedded logic to execute in the processor, the second embedded logic to connect the first fabric type portion of the multi-fabric device, and to connect a second fabric type portion of the multi-fabric device when the first fabric type connection commands stall.

21. The multi-fabric communication device of claim 18, wherein the multi-fabric device comprises a plurality of different types of communication devices each having a different fabric protocol.

22. The multi-fabric communication device of claim 19, wherein the multi-fabric device comprises a plurality of different types of message passing interface (MPI) devices.

23. A computer-readable storage medium encoded with computer executable instructions that, when executed, cause a computer to:
determine whether a connection mode exists;
connect a first communication fabric type from a plurality of communication fabric types if it is determined the connection mode exists and a connection request for the first communication fabric type is made;
determine whether the connection of the first communication fabric type of the plurality has progressed;
complete the connection if it is determined that the connection of the first communication fabric type of the plurality has progressed;
connect to a second communication fabric type, from the plurality communication fabric types, if the connection to the first communication fabric type of the plurality has not progressed; and
complete the connection to the second communication fabric type of the plurality if it is determined that the connection of the second communication fabric type of the plurality has progressed.

24. The computer-readable storage medium of claim 23, wherein the plurality of communication fabric types include different communication protocols.

25. The computer-readable storage medium of claim 23, further comprising encoded computer executable instructions that, when executed, cause the computer to:
determine if communication request is a non-blocking request, execute the communication request for all fabric types until the communication request completes for at least one fabric if it is determined that the communication request is not nonblocking.

26. A method comprising:
determining a plurality of fabric types for a multi-fabric communications device having a processor, connected to a shared memory, and a plurality of network devices with different fabric types;
generating an ordered list of the plurality of fabric types based on their latency;
determining whether commands are requested for a first fabric type in the ordered list of the plurality;
executing the commands requested for the first fabric type in the ordered list of the plurality; and
determining whether commands are requested for a second fabric type in the ordered list of the plurality if execution of the commands requested for the first fabric type in the ordered list of the plurality do not progress to a first predetermined point after a first predetermined time period.

27. The method of claim 26, wherein the first fabric type in the ordered list of the plurality has less latency than the second fabric type in the ordered list of the plurality.

28. The method of claim 26, wherein the plurality of fabric types comprises different communication protocols.

29. The method of claim 26, wherein the multi-fabric device further comprises a plurality of message passing interface (MPI) devices.

* * * * *